(12) United States Patent
Bowles et al.

(10) Patent No.: US 12,730,415 B2
(45) Date of Patent: Sep. 8, 2026

(54) SYSTEM AND METHOD FOR DE-ICING A COMMUNICATION TOWER

(71) Applicant: SMR Technologies, Inc., Fenwick, WV (US)

(72) Inventors: Dewayne Bowles, Sandstone, WV (US); Dakota Montgomery, Summersville, WV (US); Thomas Swiger, Canvas, WV (US)

(73) Assignee: SMR Technologies, Inc., Fenwick, WV (US)

( * ) Notice: Subject to any disclaimer, the term of this patent is extended or adjusted under 35 U.S.C. 154(b) by 47 days.

(21) Appl. No.: 18/921,914

(22) Filed: Oct. 21, 2024

(65) Prior Publication Data

US 2025/0130535 A1 Apr. 24, 2025

Related U.S. Application Data

(60) Provisional application No. 63/591,466, filed on Oct. 19, 2023.

(51) Int. Cl.

| | |
|---|---|
| ***G05B 11/44*** | (2006.01) |
| *B64D 15/16* | (2006.01) |
| *F15B 11/068* | (2006.01) |
| *F15B 21/00* | (2006.01) |
| *G05B 11/58* | (2006.01) |
| *G05B 19/042* | (2006.01) |

(52) U.S. Cl.

CPC ............ *G05B 11/44* (2013.01); *B64D 15/166* (2013.01); *F15B 11/068* (2013.01); *F15B 21/005* (2013.01); *G05B 11/58* (2013.01); *G05B 19/0423* (2013.01); *G05B 19/0425* (2013.01); *G05B 19/0428* (2013.01)

(58) Field of Classification Search

CPC .... G05B 11/44; G05B 11/58; G05B 19/0423; G05B 19/0425; G05B 19/0428; F15B 11/068; F15B 21/005; B64D 15/166

USPC ............................................................ 137/14

See application file for complete search history.

(56) References Cited

U.S. PATENT DOCUMENTS

| | | | | |
|---|---|---|---|---|
| 4,779,823 A * | 10/1988 | Ely | B64D 15/166 |
| | | | 244/134 A |
| 5,112,011 A * | 5/1992 | Weisend, Jr. | B64D 15/166 |
| | | | 244/134 A |
| 5,310,142 A * | 5/1994 | Weisend, Jr. | B64D 15/166 |
| | | | 244/134 A |

(Continued)

*Primary Examiner* — Minh Q Le

(74) *Attorney, Agent, or Firm* — Benesch Friedlander Coplan & Aronoff LLP

(57) ABSTRACT

A de-icing system and method for mitigating the accumulation of snow and ice on components of a communication tower includes a de-icing assembly attached to a component of a communications tower, and an air supply. The de-icing assembly includes a backing member, a pneumatic tube affixed to the backing member, and a fastener for affixing the backing to the component of the tower. The pneumatic tube is configured to be periodically inflated and deflated by the air supply to dislodge any snow or ice accumulated thereon. A controller monitors signals from a plurality of sensors to initiate the cycling of the inflation and deflation of the pneumatic tubes upon a determination that an accumulation of snow or ice is present on the component of the tower or the de-icing assembly.

14 Claims, 16 Drawing Sheets

(56) References Cited

U.S. PATENT DOCUMENTS

| | | | | | |
|---|---|---|---|---|---|
| 5,337,978 | A * | 8/1994 | Fahrner | B64D 15/166 | 244/134 A |
| 5,562,265 | A * | 10/1996 | Rauckhorst, III | B64D 15/166 | 244/134 A |
| 5,569,850 | A * | 10/1996 | Rauckhorst, III | G01N 29/09 | 29/610.1 |
| 6,129,314 | A * | 10/2000 | Giamati | B64D 15/163 | 244/134 A |
| 6,443,394 | B1 * | 9/2002 | Weisend, Jr. | B64D 15/166 | 244/134 A |
| 6,520,452 | B1 * | 2/2003 | Crist | B64D 15/16 | 244/134 A |
| 10,640,217 | B2 * | 5/2020 | Botura | B64F 5/60 | |
| 11,117,672 | B2 * | 9/2021 | Giamati | B64D 15/12 | |
| 11,142,324 | B2 * | 10/2021 | Briand | B29C 66/433 | |
| 12,434,846 | B2 * | 10/2025 | Gopinath Gowda | B64F 5/10 | |
| 2003/0155467 | A1 * | 8/2003 | Petrenko | B64D 15/22 | 244/134 R |
| 2016/0214726 | A1 * | 7/2016 | Giamati | G01R 31/54 | |
| 2017/0266753 | A1 * | 9/2017 | Schomer | B29C 66/438 | |
| 2022/0396360 | A1 * | 12/2022 | Slane | B64D 15/166 | |

* cited by examiner

A-A

A-A

SYSTEM AND METHOD FOR DE-ICING A COMMUNICATION TOWER

CROSS-REFERENCE TO RELATED APPLICATIONS

This application claims priority to U.S. Provisional Application Ser. No. 63/591,466 filed Oct. 19, 2023, the entire contents of which is hereby incorporated by reference herein.

FIELD

The present disclosure generally relates to systems and methods for mitigating snow and ice accumulation on communication towers. More specifically, the present disclosure relates to a modular system of selectively actuated pneumatic members strategically placed on communication towers for mitigating and removing snow and ice accumulation from various components of a communication tower, including structure legs, cross braces, and antennas.

BACKGROUND

Communication towers are necessary components for facilitating a number of modern communication systems, such as radio and television broadcasts, cell phone networks, wireless and broadband system, and the like. A photograph of a typical communication tower 100 is provided as FIG. 1. A communication tower 100 typically includes a number of main structural members such as legs 110 that support the overall structure and numerous cross braces 120 connecting and stabilizing the legs 110.

One or more antennas 130 are mounted onto the communication tower 100 to facilitate the applicable communication network. Accompanying the communication tower 100 is often a small building 140 that houses electrical and power equipment to operate the communication tower 100.

As such communication systems expand to reach all areas where people live and work, communication towers are regularly located in remote areas and exposed to various harsh climates. As communication networks have expanded into northern climates, communication towers are increasingly exposed to low temperatures and extreme snowfall that are common at northern latitudes. For example, communication towers are now common in northern Alaska to facilitate the extension of communication networks to people living and working there. When communication towers are located in such northern climates, it is common for snow and ice to accumulate on the communication tower. FIGS. 2 and 3 are photographs of communication towers covered in snow and ice. Such snow and ice coverage can interfere with the operations of the antennas attached to the communication towers and, more critically, as chunks of snow and ice inevitably breakaway from the communication tower, such chunks fall and can hit lower placed antennas, structural components of the communication tower, and any surrounding structures. As will be appreciated, the chunks of snow and ice can be quite large and can cause significant damage upon impact with antennas, structural components, and structures. Such damage can be severe enough to affect the operations of the communication tower and can in certain cases, render the communication tower inoperable. Because of the remote nature of certain communication towers, such damage can cause significant downtime along with requiring costly repairs. It is estimated that in certain circumstances, maintaining a single communication tower through a single severe winter can cost up to a million dollars in repair and maintenance costs.

In order to save significant costs of repair and maintenance and improve continuous operation of communication towers, there is a need for systems that mitigate snow and ice accumulation on communication towers situated in cold and snowy climates. Disclosed herein are such systems.

SUMMARY

Novel systems for mitigating the accumulation of snow and ice on a communication tower (also referred to as a communication tower de-icing system) are described and disclosed herein. In one embodiment the system includes multiple leg de-icing assemblies, multiple cross brace de-icing assemblies, and multiple antenna de-icing assemblies. The leg de-icing assemblies include various sizes and arrangements so that the leg de-icing assemblies can be attached to various locations on the legs of a communication tower. Similarly, the cross brace de-icing assemblies include various sizes and arrangements so that the cross brace de-icing assemblies can be attached to various styles and shapes of cross braces of a communication tower. The antenna de-icing assemblies can also come in various shapes and sizes to accommodate various styles of antennas.

Such a system with multiple de-icing assemblies functions as a modular system that can be selectively customized to accommodate a particular communication tower's configuration and arrangement. For example, different sizes of leg de-icing assemblies can be attached to different sections of the legs of the communication tower depending on the dimensions of the leg at specific locations and the available space to attach a de-icing assembly at those specific locations. The cross braces of communication towers vary in size, style, and shape. The modular nature of the de-icing system can accommodate such variations.

The de-icing assemblies are comprised of one or more pneumatic members that can be selectively actuated to inflate and displace snow and ice that is beginning to accumulate or has accumulated on the communication tower's various structures. The selective actuation can be periodic based on a predetermined schedule or can be based on the collection and evaluation of information collected from sensors and other sources. Such selective actuation and the resulting displacement of snow and ice prior to significant accumulation can limit or eliminate issues of damage due to large chunks of snow and ice falling from the communication tower.

BRIEF DESCRIPTION OF DRAWINGS

In the accompanying drawings, structures are illustrated that, together with the detailed description provided below, describe example embodiments of the disclosed systems, methods, and apparatus. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

DETAILED DESCRIPTION

Figure 1:
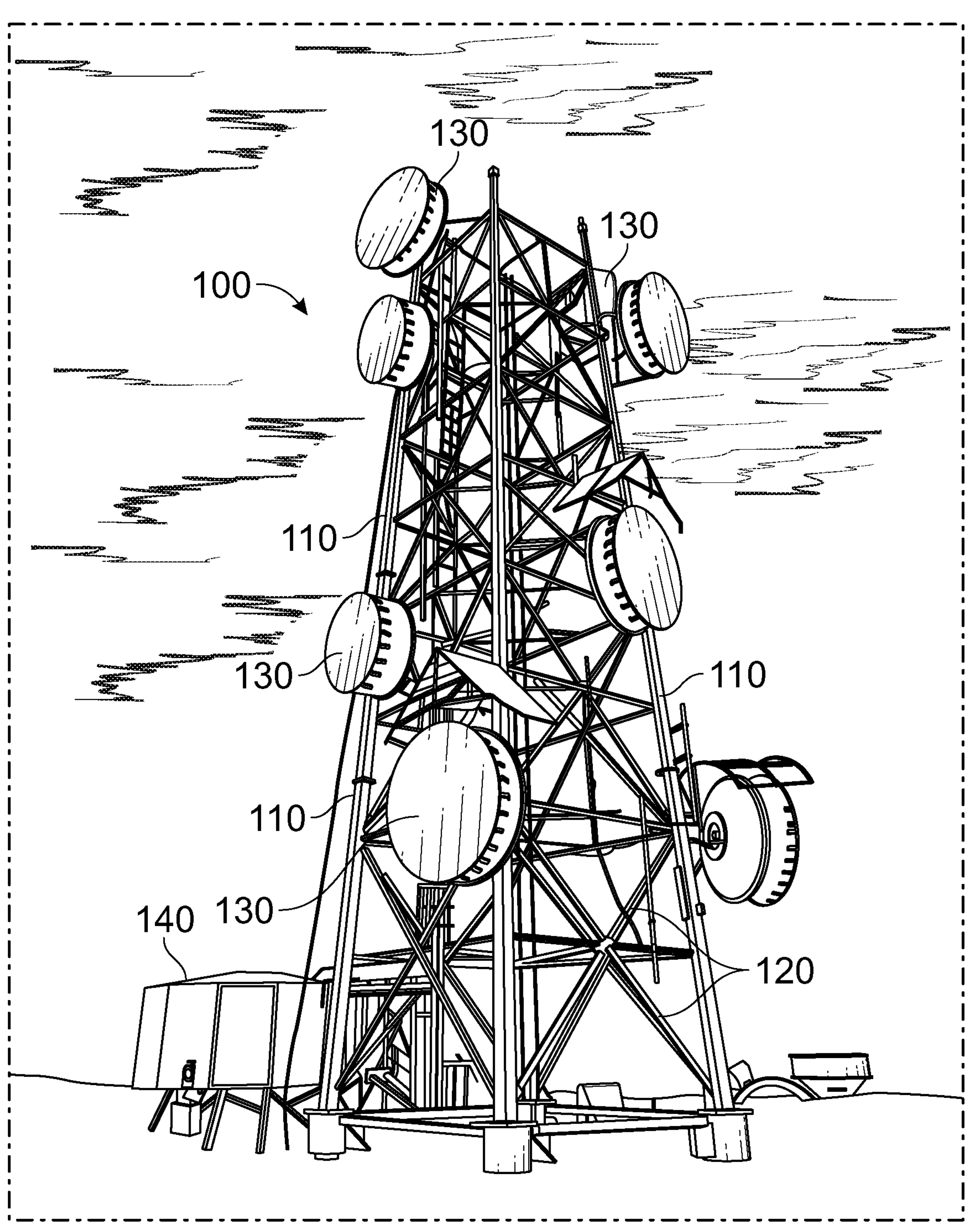
FIG. 1 is a photograph depicting an exemplary communication tower.
Figure 2:
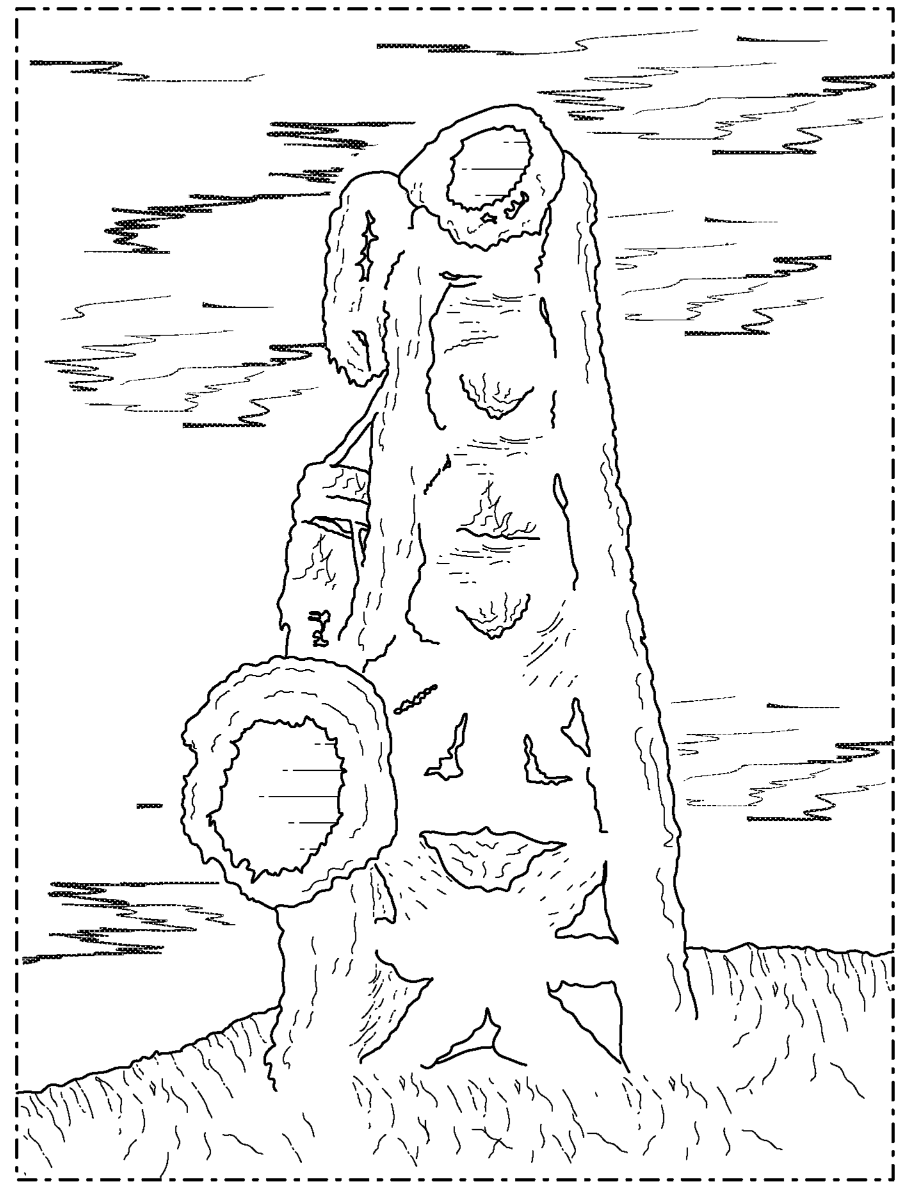
FIG. 2 is a photograph depicting an exemplary communication tower encased in snow and ice.
Figure 3:
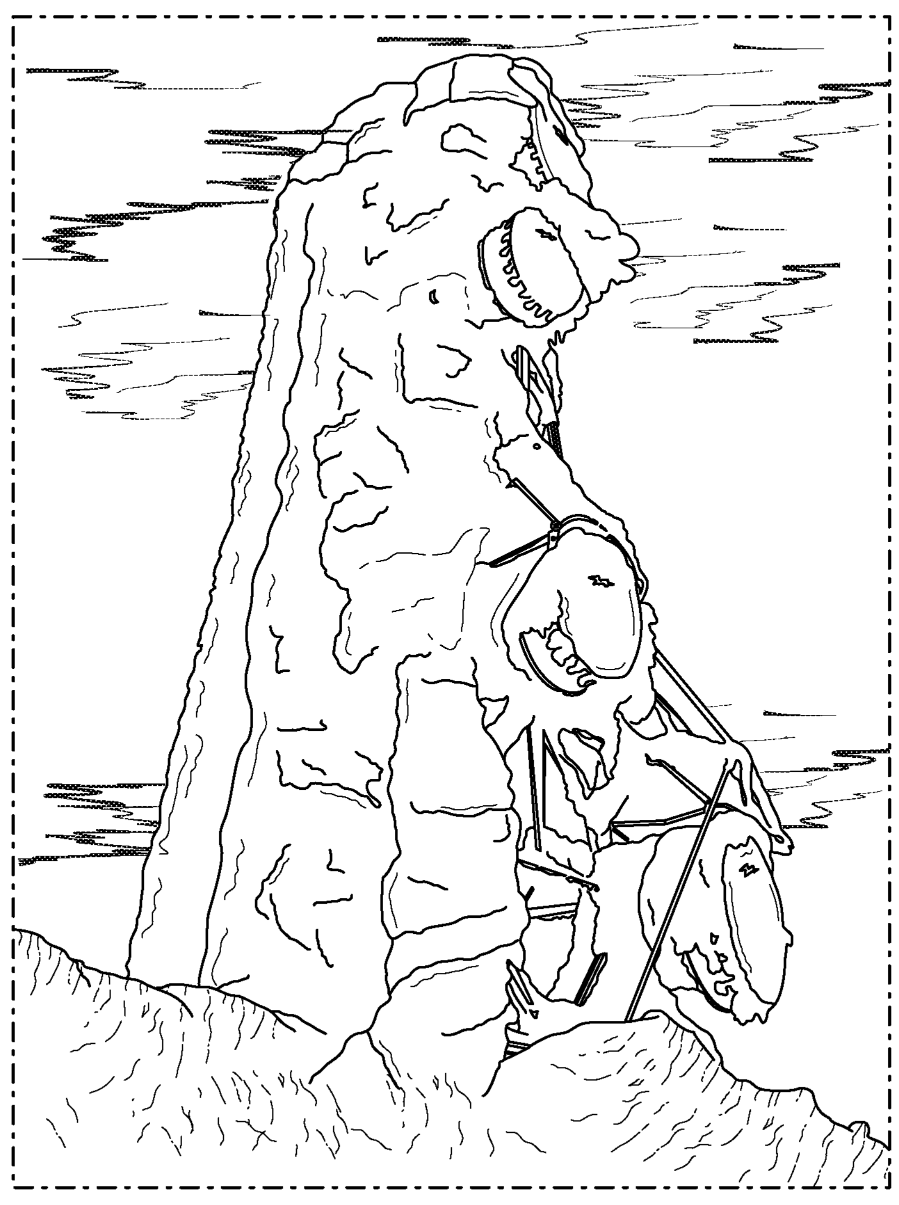
FIG. 3 is another photograph depicting an exemplary communication tower encased in snow and ice.

The apparatus, systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of systems for mitigating the accumulation of snow and ice on a communication tower are hereinafter disclosed and described in detail with reference made to FIGS. 1 through 16.

One embodiment of a system for mitigating the accumulation of snow and ice on a communication tower includes a number of modular components that are designed and configured to be attached to various components and/or sections of a communication tower, such as, for example, antennae and/or structural members including legs and cross members. As will be further described herein, modular components can be designed and arranged for attachment to the legs of a communication tower, other modular components can be designed and arranged for attachment to the cross braces of a communication tower, and other modular components can be designed and arranged for attachment to the antennas of a communication towers. Each such component can be of different sizes and arrangements so that the component is attachable to different sections of the legs, different styles and sizes of cross braces, and different styles and sizes of antennas.

Generally, the modular components include versatile fastening mechanisms for securely attaching such components to various sections of the communication tower. The components generally include a robust backing member, sheet, or other substrate that provides the structural integrity for the component to perform its intended function and to survive harsh environmental conditions. The backing member can be a flexible sheet configured to, or capable of, conforming to the shape of a surface to which it is secured, or a rigid structural member. The components include one or more pneumatic tubes or bladders that can be selectively inflated and deflated via an air supply source, such as pneumatic pump, air compressor, air tank connected to one or more air compressors or pumps, or the like. In one embodiment, all the pneumatic tubes of a component are arranged so that all the tubes are selectively inflated and deflated together and simultaneously. In another embodiment, each individual pneumatic tube can be selectively inflated and deflated regardless of the status of the other tubes. In such embodiments, whether inflated individually or collectively, the pneumatic tubes can be isolated so that if one pneumatic tube is damaged such that it cannot hold pressure, the remaining pneumatic tubes of the component are unaffected by such damage. It will be appreciated that as snowfall accumulates on the modular components, such components can be inflated and deflated to displace the accumulation of snow and ice from the communication tower. The inflation and deflation of the modular components can be initiated as snow and ice begins to accumulate, and continued on a periodic basis, so that any amount of snow and ice displaced from the communication tower is small enough not to cause any damage to lower parts of the communication tower or surrounding structures as the displaced snow and ice falls from the communication tower and falls onto or hits such lower parts or surrounding structures.

Figure 4:
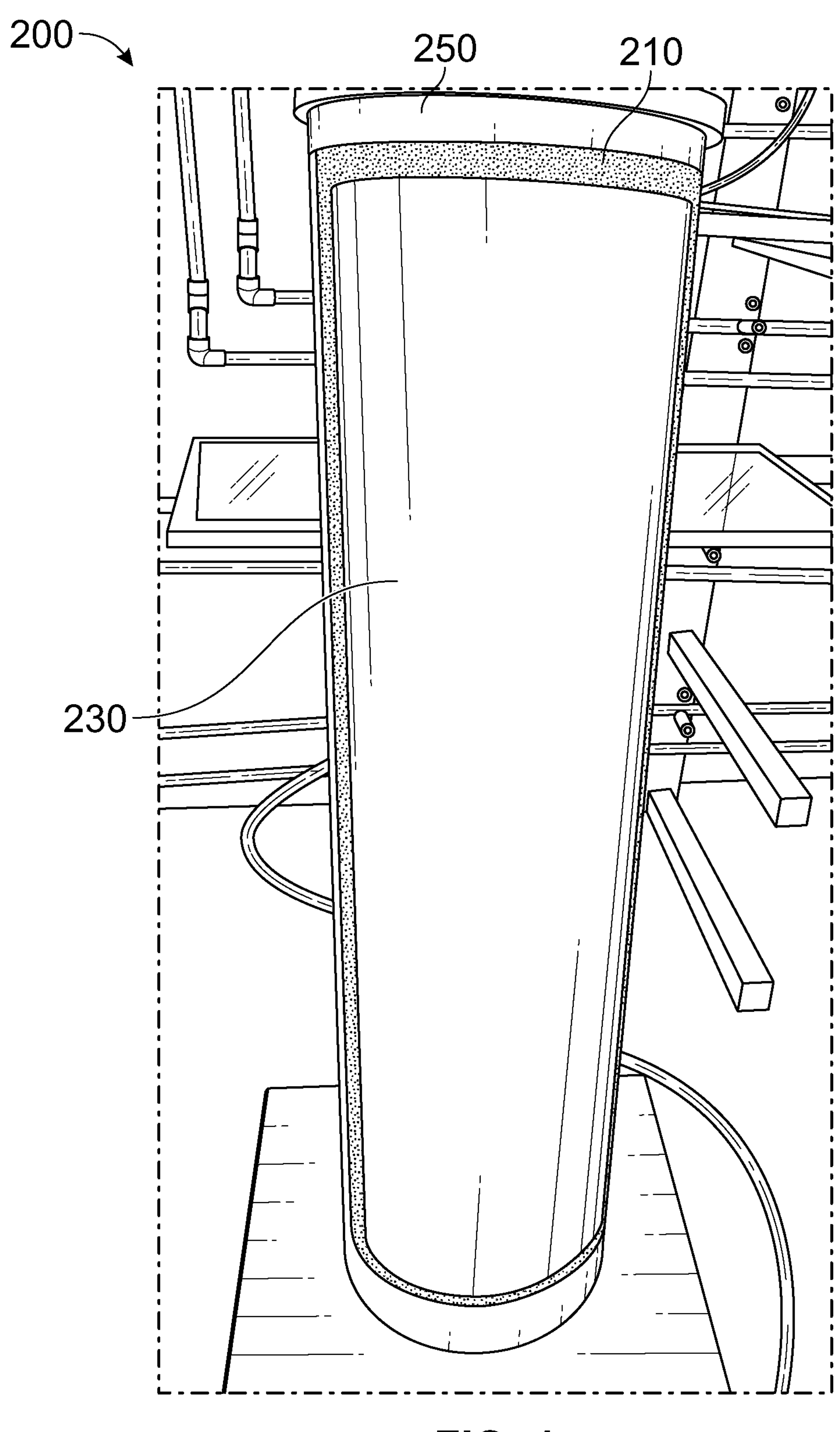
FIG. 4 is a front perspective view of an embodiment of a leg de-icing assembly installed on a cylindrical structure representative of an exemplary structural member of a communication tower.
Figure 5:
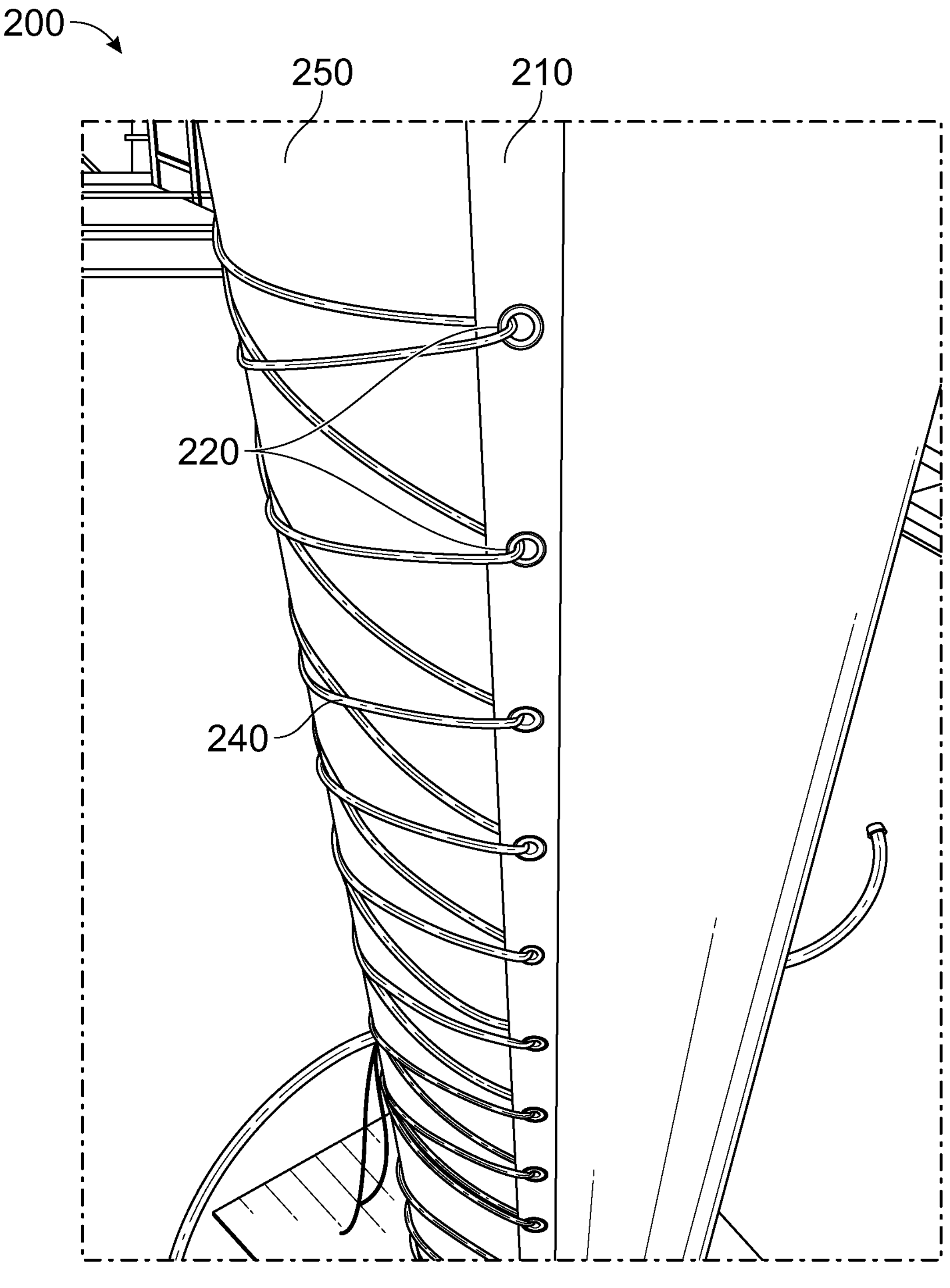
FIG. 5 is a left side perspective view of an embodiment of a leg de-icing assembly installed on a cylindrical structure representative of an exemplary structural member of a communication tower.

Referring to FIGS. 4 and 5, a leg de-icing assembly 200 affixed to a cylindrical structure 250, for example a leg of a communications tower, is shown in a front perspective view and a left side perspective view respectively. In this embodiment, the leg de-icing assembly 200 includes a heavy backing 210 with a number of metal grommets 220 disposed along the edges of the leg de-icing assembly 200 (as best illustrated in FIG. 5). A series of tubes or bladders 230 are secured to a front facing of the heavy backing 210. In one embodiment, the series of tubes or bladders 230 are fabricated with/from the backing 210 such that the tubes or bladders 230 and backing 210 are an integral component in which the tubes or bladders 230 are formed in predetermined area between the backing and a top layer that are not bonded to each other at such predetermined areas. Accordingly, the tubes or bladders 230 may have alternate shapes or be laid out in alternate patterns on the backing 210, other than just longitudinal tubes, such as a matrix or grid of individual circular, square, or rectangular shaped bladders, without departing from the scope of the present disclosure. However, for simplicity, throughout the remainder of the specification, the bladders will be referred to as either tubes or pneumatic tubes 230. In one example, the backing is made from a polymer material, and such an integral component is formed by co-curing the tubes 230 and backing 210. In another embodiment, the tubes 230 are bonded directly to the backing 210 with an adhesive. The series of tubes or bladders 230 are positioned vertically (relative to FIGS. 4-6) and in close proximity to one another. In one example, the leg de-icing assembly 200 includes six tubes that are each 4 inches in width and 32 inches long. The leg de-icing assembly 200 is generally pliable and flexible so as to conform to the shape of a leg of a communication tower when attached to said leg. As best illustrated in FIG. 5, the leg de-icing assembly 200 can be secured to a leg of the communication tower by wrapping the leg-deicing assembly over a front side of the leg of the tower and lacing a robust cable 240 across a back side of the tower leg and through a series of grommets 220 disposed at the sides of the assembly, in a back and forth, or zig-zag, fashion. In this manner, the sides of the assembly can be pulled tight around the tower leg. In the example illustrated, the cable is a repurposed parachute cord ("paracord") that has robust physical and mechanical properties to withstand harsh elements and provide a long service life. It will be understood that a number of other types of cables, or cords, besides paracord can be used in a cable and grommet attachment system, provided the cable has robust physical and mechanical properties. Additionally, a number of alternative fastening methods can be used, for example, industrial zip-tie straps or a rachet-and-can type fastening restraints can be used to secure the de-icing assembly 200 to a structural component of the communications tower without departing from the scope of the present disclosure. In the illustrated example, the leg de-icing assembly 200 is wrapped around approximately half the circumference of the leg. However, in other embodiments, the leg deicing assembly may be wrapped substantially around the entire circumference of the leg, or a smaller portion of the circumference, based on specific circumstances and input from system designers and installers.

Figures 6, 6A, 6B:
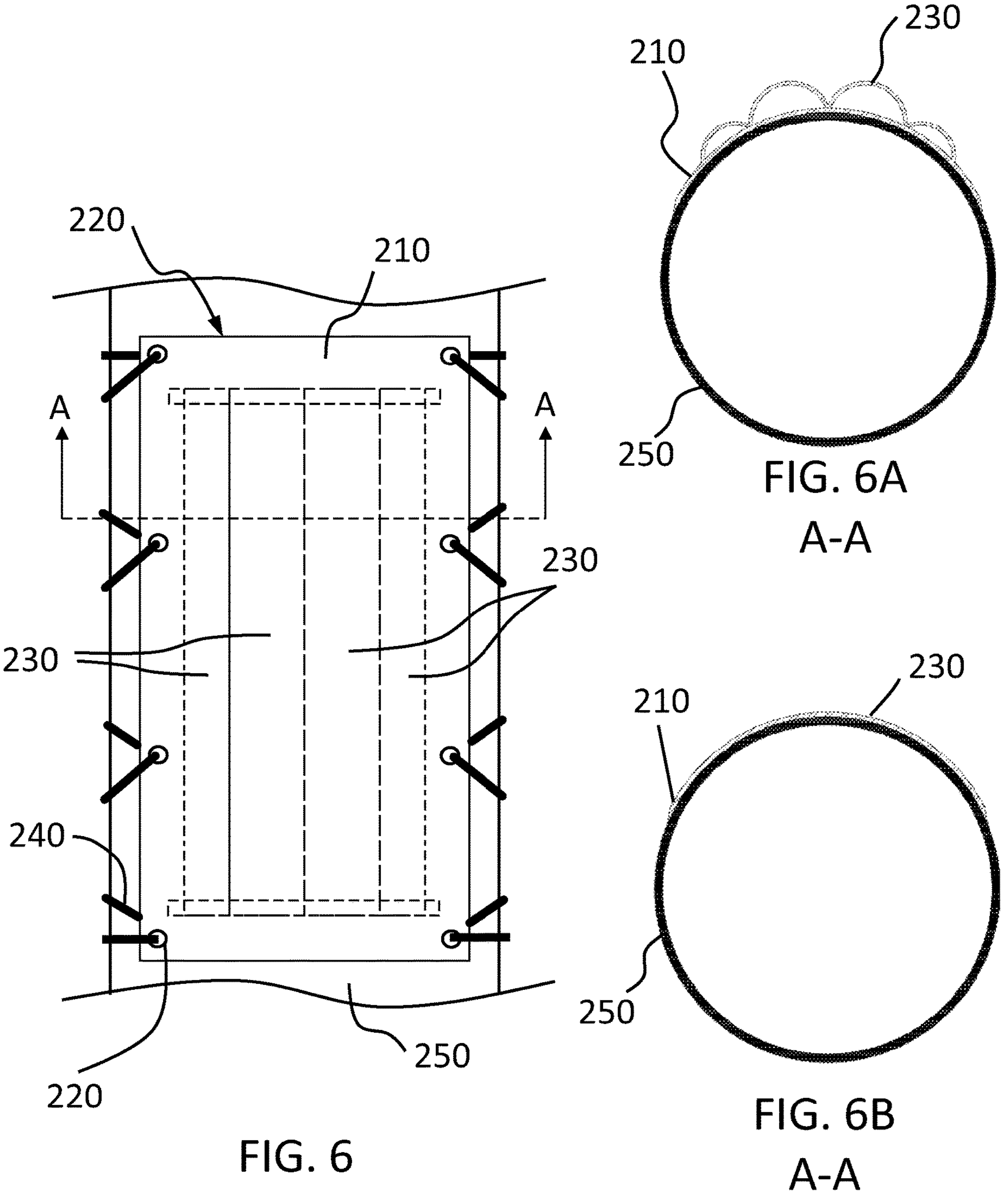
FIG. 6 is a front schematic view of an embodiment of a de-icing assembly affixed to an exemplary cylindrical structural member.
FIG. 6A is a cross section view of the de-icing assembly of FIG. 6 with the tubes in an inflated state, expanded radially away from the structural member.
FIG. 6B is a cross section view of the de-icing assembly of FIG. 6 with the tubes in an deflated state, laying against and conforming to the curved shape of the structural member.

The cable 240, or other types of fasteners, should be sufficiently tensioned, or place sufficient tension in the flexible de-icing assembly, so as to secure the de-icing assembly 200 fairly tightly to the communications tower leg or other such structural component to make the inflation and deflation of the tubes 230 as efficient and effective as possible. Referring to FIG. 6, a front schematic view of the de-icing assembly 200 is shown affixed to a cylindrical structural member 250 of a communications tower, such as a leg. FIGS. 6A and 6B show a cross section view of the de-icing assembly 200 affixed to the cylindrical structural member in FIG. 6, taken about section line A-A, in each of an inflated state (FIG. 6A), and a deflated state (FIG. 6B) respectively. In one example, such as that shown if FIGS. 6, 6A, and 6B, the tubes 230 are flexible elastomeric pneumatic tubes that each define an empty expandable chamber that is configured to be inflated with, or by, pressurized air and deflated either by discontinuing the flow of pressurized air to each such tubes 230 or by applying a negative pressure to evacuate the tubes. When the tubes are not under pressure and are instead in an uninflated or evacuated state, because the tubes 230 are elastomeric, the tubes 230 automatically retract themselves and are generally substantially flat and/or conform to the shape of a surface of the structure to which they are affixed or attached. When pressurized air is supplied to the elastomeric tubes 230, they inflate and expand radially outward with respect to a longitudinal axis of the tubes 230 and generally away from the surface of the structure to which they are attached. It will be understood that the arrangement and dimensions provided in this paragraph for a leg de-icing assembly 200 are only examples of one specific embodiment, but can have any alternate dimensions as needed based on the dimensional requirements of the communications tower to which the de-icing assembly 200 will be applied. For instance, a leg de-icing assembly can be longer or shorter than 32-inches and can include fewer or more than six total tubes 230. In accordance with the description of the overall system as a modular system, there can be several versions of the leg de-icing assemblies with varying numbers and shapes of the tubes 230, dimensions, and arrangements to facilitate covering different sections of the legs of the communication tower.

Figure 7:
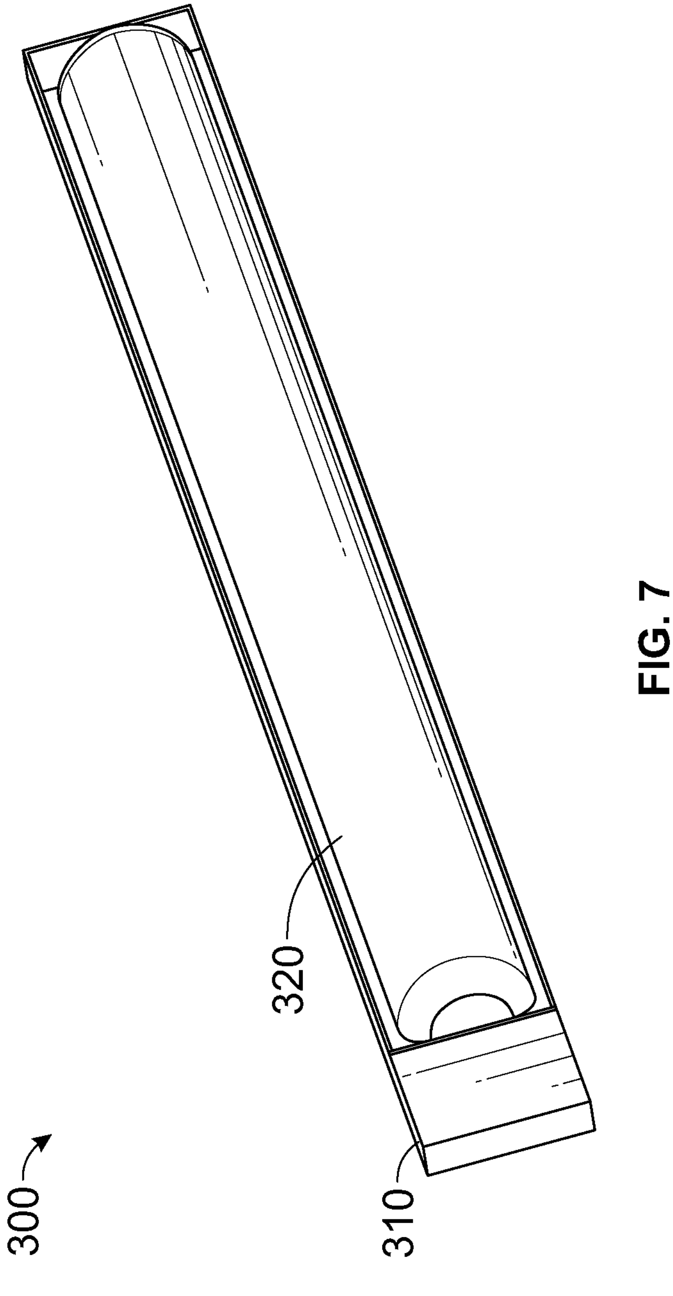
FIG. 7 is a perspective view of an embodiment of a cross brace de-icing assembly affixed to an exemplary schematic cross brace member.

FIG. 7 is a schematic illustration of a cross brace de-icing assembly 300. In this embodiment, the cross brace de-icing assembly 300 includes a heavy backing 310 and a single tube or bladder 320 secured to a front facing of the heavy backing 310 using adhesive or other such securing method. The cross brace de-icing assembly 300 is arranged to be secured to a cross brace of a communication towers and can include any number of attachment mechanisms. For example, the cross brace de-icing assembly 300 can include a grommet and cable combination or other attachment mechanisms as discussed above. Communication towers can include cross brace structures having a number of different shapes, such as a square tubing, c-channel, or angle-iron that has various flat sections of metal, or round tubing that has a curved outer surface or round cross section of metal. Thus, in one embodiment, the backing 310 can be arranged as a flat component with the backing 310 matching the shape of a cross brace that is or has a flat section of metal. In another embodiment, the backing 310 can include a longitudinal channel or concave cutout having a semicircular cross section to match a cross brace that is a round metal tube. As with the leg de-icing assemblies, the overall system can include a number of cross brace de-icing assemblies of different dimensions and arrangements to accommodate different sizes and styles of cross braces.

Figure 8:
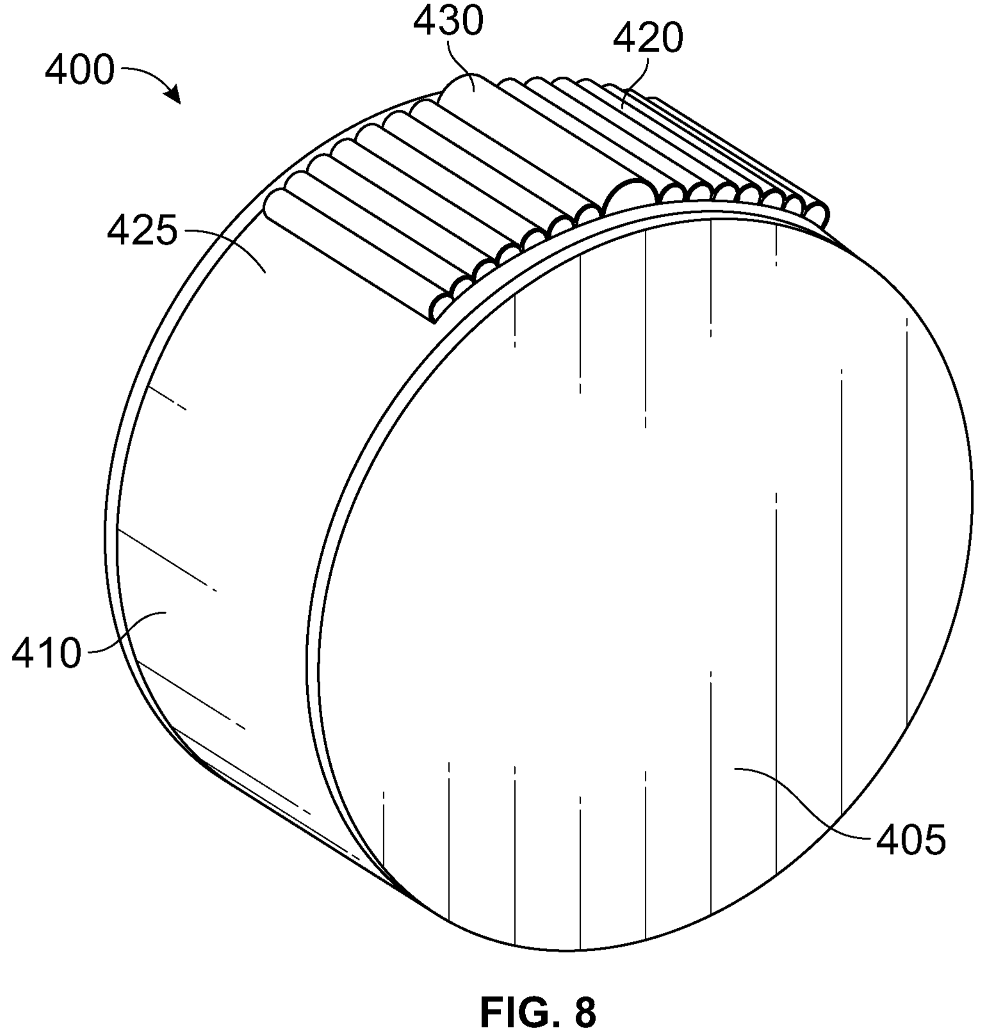
FIG. 8 is a perspective view of an embodiment of an antenna de-icing assembly applied to an exemplary antenna.

FIG. 8 is a schematic illustration of an antenna de-icing assembly 400 to be applied to an antenna 405 of a communications tower. In this embodiment, the antenna de-icing assembly 400 includes a heavy backing 410 and a series or plurality of tubes or bladders 420 secured to a section of a front or top facing 425 of the heavy backing 410 using adhesive or other such securing method. The antenna de-icing assembly 400 is arranged to be secured to an antenna 405 of a communication towers. In the example illustrated, the antenna 405 is a drum antenna that is cylindrical in shape, and the de-icing assembly 400 is arranged to wrap around and be secured to the cylinder shaped outer drum of the drum antenna. The antenna de-icing assembly 400 can be secured around the outer periphery or surface of the antenna drum by any number of fastening mechanisms to secure the assembly 400 to the antenna 405. The series of tubes 420 in this illustrated example include a total of 15 tubes aligned parallel and proximate to each other, and parallel to a longitudinal axis of the antenna drum, with a larger tube 430 centered in the cluster of tubes 420 and the tubes becoming progressively smaller in diameter as the series of tubes 420 extends outward from the larger center tube 430. The antenna de-icing assembly 400 is secured to the antenna so that the series of tubes 420 is positioned on a top surface of the outer drum of the antenna 405. It will be appreciated that as snow falls, it tends to rest on the top surface of the antenna 405; therefore, the tubes 420 will be most useful when positioned on that top surface. The antenna de-icing assembly 400 illustrated herein is but one example of an arrangement of tubes 420. It will be appreciated that many different arrangements of tubes can be utilized depending on the type and shape of antenna 405 and where on the communication tower the antenna 405 is located.

Communication towers can include a number of different sizes and shapes of antennas, thus several different antenna de-icing assemblies can be arranged to fit onto and be secured to such variety of antennas. As with other assemblies, the overall system can include a number of antenna de-icing assemblies of different dimensions and arrangements to accommodate different sizes and styles of antennas.

Once leg de-icing assemblies, cross brace de-icing assemblies, and antenna de-icing assemblies are secured to a communication tower, in operation the assemblies can be cycled on and off (i.e. inflated and deflated) in a periodic manner. For example, the assemblies can be cycled every 60 seconds. Such cycling will prevent the buildup of snow and ice on the communication tower by expanding the surface of the de-icing assemblies on which the snow and or ice is accumulating or settling, to cause any ice thereon to fracture or break up, and unsettle any snow accumulated thereon, which ultimately causes both snow and ice buildup to fall off the de-icing assemblies to the ground below. It will be appreciated that many towers are located in remote and inhospitable locations. Often, access to electrical power may be limited, so the design of such communication towers must prudently use the electrical power available to the communication tower. Thus, cycling the deicing assemblies when they are not needed can waste the limited supply of power. To mitigate this issue, a number of sensors can be applied to and around the communication tower to selectively activate the de-icing assemblies only when they are needed.

The first such sensor is a temperature sensor. Once the temperature sensor senses a temperature of 32 degrees Fahrenheit or lower, the cycling of the de-icing assemblies can be initiated. A second such sensor used by the system can be a moisture sensor that senses if moisture, in the form of snow or ice (referred to as a "snow detector"), is present around the communication tower. A controller in operative communication with the temperature sensor may be utilized to initiate cycling of the inflation and deflation of the tubes of the de-icing assemblies when the temperature sensor reads a temperature of 32 degrees Fahrenheit or below and the snow detector senses snow and/or ice at the communication tower. Coupling the temperature and snow detector can further conserve power and still effectively de-ice the communication tower.

Figure 9:
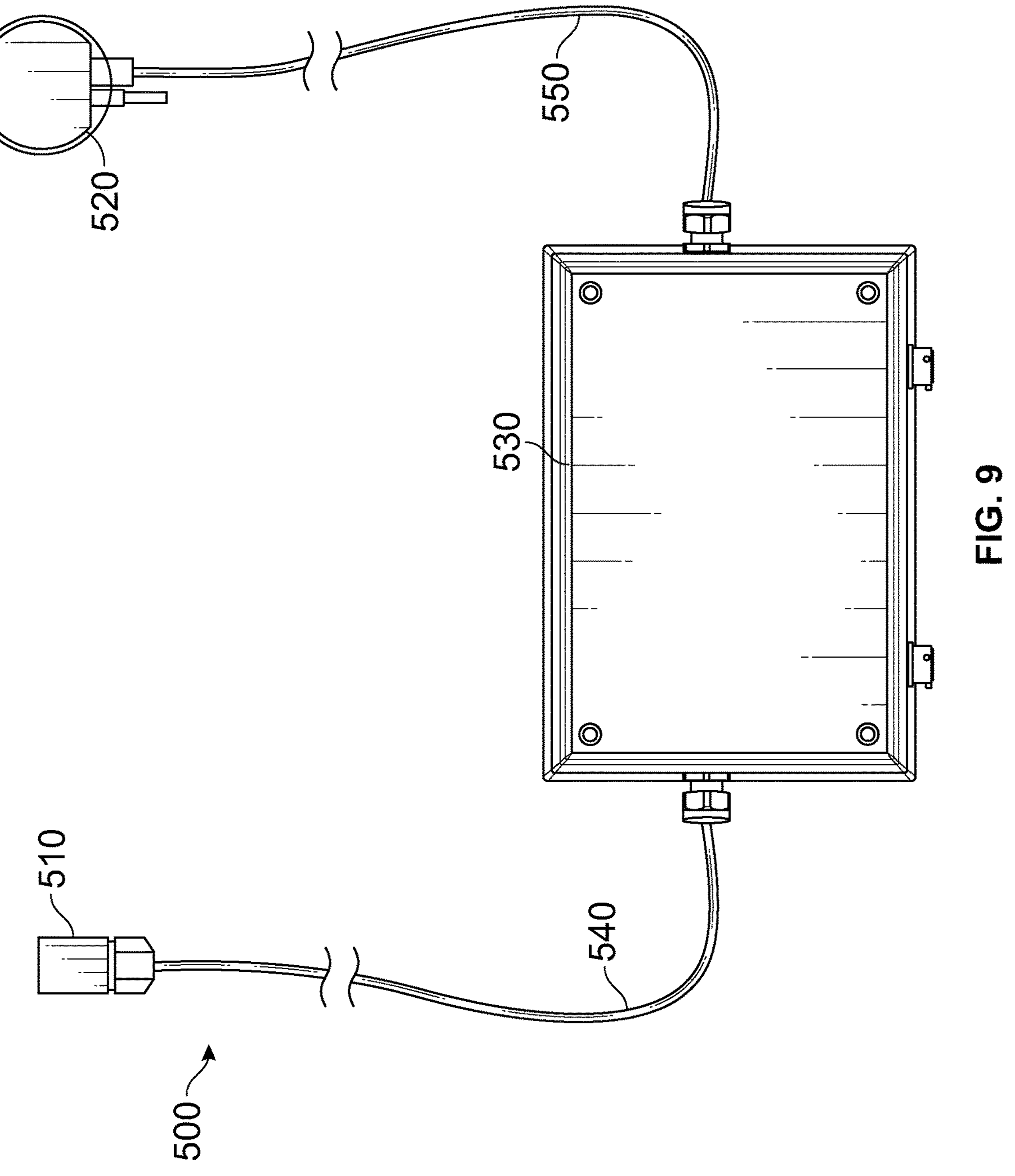
FIG. 9 is a schematic illustration of an embodiment of a control system for determining when to cycle deicing assemblies.
Figure 11:
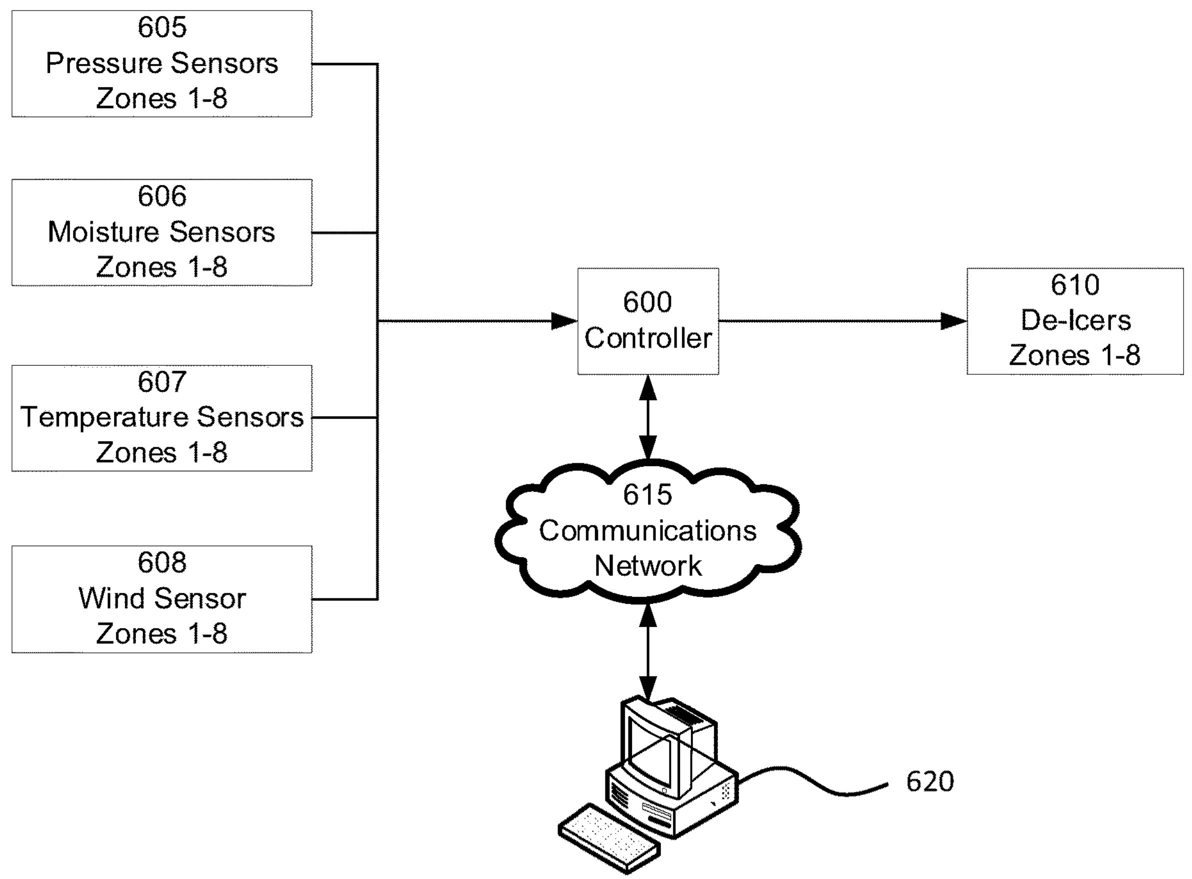
FIG. 11 is a high level system diagram illustrating the operation of the de-icing system.

Referring to FIGS. 9 and 11, a schematic flow chart depicts a control system 500 configured to both determine when to cycle de-icing assemblies between an inflated state and a deflated state, and control the cycling of such de-icing assemblies. The control system 500 includes a moisture sensor 510 in the form of a snow and ice detector probe and a temperature sensor 520 that are each operatively connected to and in communication with a controller 530 via separate communications cables 540, 550. The controller 530 can analyze the readings from the moisture sensor 510, or snow and ice detector probe, and the temperature sensor 520 and make a determination on whether or not to cycle the de-icing assemblies.

Additionally, one or more pressure sensors can be added to the control system 500 at key locations on the communication tower to measure various pressures of/at various components of the tower or de-icing assembly. In one embodiment, one or more pressure sensors are added to the control system to measure pressure in the tubes. The pressure sensors and control system are arranged so that pressure readings from the sensor can be used to determine if individual tubes have ruptured or are experienced a leak. If the sensor senses such a rupture or leak, the control system can stop cycling that particular tube and can initiate an alarm so that the issue can be addressed and corrected. Pressure sensors can also be added to the control system 500 to determine if snow and ice has accumulated. In one example, one or more pressure sensors added to a control system that inflates and deflates tubes can monitor pressure within tubes spread across the communication tower and use such readings to determine if snow or ice has accumulated on one or more of the tubes. If the pressure within a tube is higher than expected, the elevated pressure is likely due to the accumulation of snow and ice on the tube. The tube(s) can then be selectively inflated and deflated as required to remove the accumulated snow or ice.

In another exemplary embodiment, pressure sensors can be attached to various points on the communication tower to directly measure the accumulation of snow and ice. The tubes of a de-icing assembly located proximate to the pressure sensors can then be selectively inflated and deflated if a sensor reads a positive pressure (i.e., snow and/or ice beginning to accumulate on the communication tower) to remove the accumulated snow or ice. Pressure sensors can be used in cooperation with the temperature sensor. For example, only if the temperature sensor reads a sub-32 degree Fahrenheit temperature will the measurement from pressure sensors be monitored and if the pressure sensors detect snow and ice accumulation, then cycling of the de-icing assemblies can be initiated. The cycling can be paused periodically to see if the pressure sensors continue to measure increasing, elevated, or positive pressure to determine if it is still snowing. Another useful sensor is a wind sensor that senses the direction and speed of the prevailing wind. Such measurements can give the system insight into the direction of travel of snow and can be a factor in determining which de-icing assemblies to activate.

Figure 10:
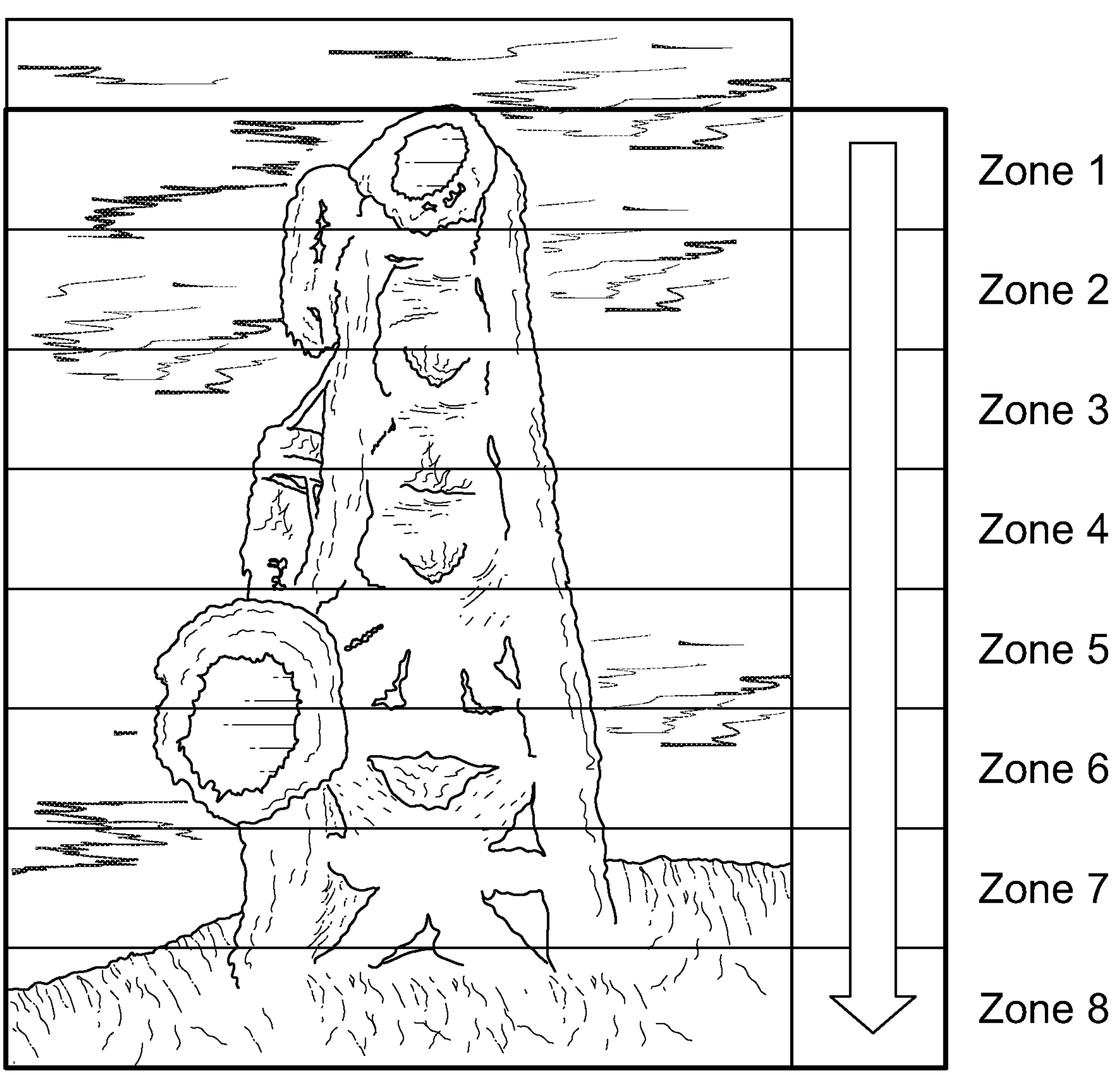
FIG. 10 is an illustration of a communication tower schematically and visually divided into 8 zones.

When designing a system that manages the snow and ice accumulation on communication towers, it can be useful to divide the communication tower into vertical zones. Referring to FIG. 10, a communication tower is shown divided into eight successive zones. Each zone can be treated individually by the de-icing system. Such an arrangement can simplify a control system and conserve resources such as electricity. In one example, a greater number of de-icing assemblies can be positioned in the upper zones, such as zones 1, 2, 3, and 4. These zones often experienced more snow and ice buildup and therefore pose the greatest danger for causing damage, as chunks of snow and ice fall from the increased heights of the upper zones, which can readily damage equipment attached to the lower zones. When periodic cycling is implemented, the schedule of the inflating and deflating of tubes can be uniform across a single zone, but differ from zone to zone. Sensors can be placed in all 8 zones and the de-icing assemblies of each zone can be activated depending on the readings of sensors located in that zone. Each zone can be operated independently from all other zones, which achieves the desired results and saves energy. For example, each zone can include a pressure sensor. When a pressure sensor determines that snow and ice is accumulating in its zone, all the tubes deployed in that zone can be activated until the pressure sensor determines that snow and ice is no longer accumulating.

FIG. 11 is a system diagram that depicts the operation of a system for mitigating the snow and ice accumulation on communication towers. A controller 600, such as a programmable logic (PLC) controller, receives inputs from a plurality of sensors, such as for example one or more pressure sensors 605, moisture sensors 606, and temperature sensors 607, located in the applicable zones. Based on the inputs, the controller 605 determines if the de-icing assemblies in one or more zones should be activated. The controller 605 then initiates the cycling of inflation and deflation of tubes in the de-icing assemblies 610 in any applicable zones. The controller 600 continues to monitor the inputs and operation of the de-icing assemblies and makes any adjustments required. The controller 605 can be connected to a communications network 615 and configured to permit control of the de-icing system from a remote terminal 620, at a location remote from the communication tower. It will be appreciated that human operators may want to control the system from a remote terminal 620 of an operations center, or at least be able to serve as a manual control backup for an automated function control that is programmed into the controller 600, to ensure that the de-icing system is working property. The controller 605 can send either continuous or periodic data or reports to the operations center 615 to inform operators of the performance of the de-icing system.

Figure 12:
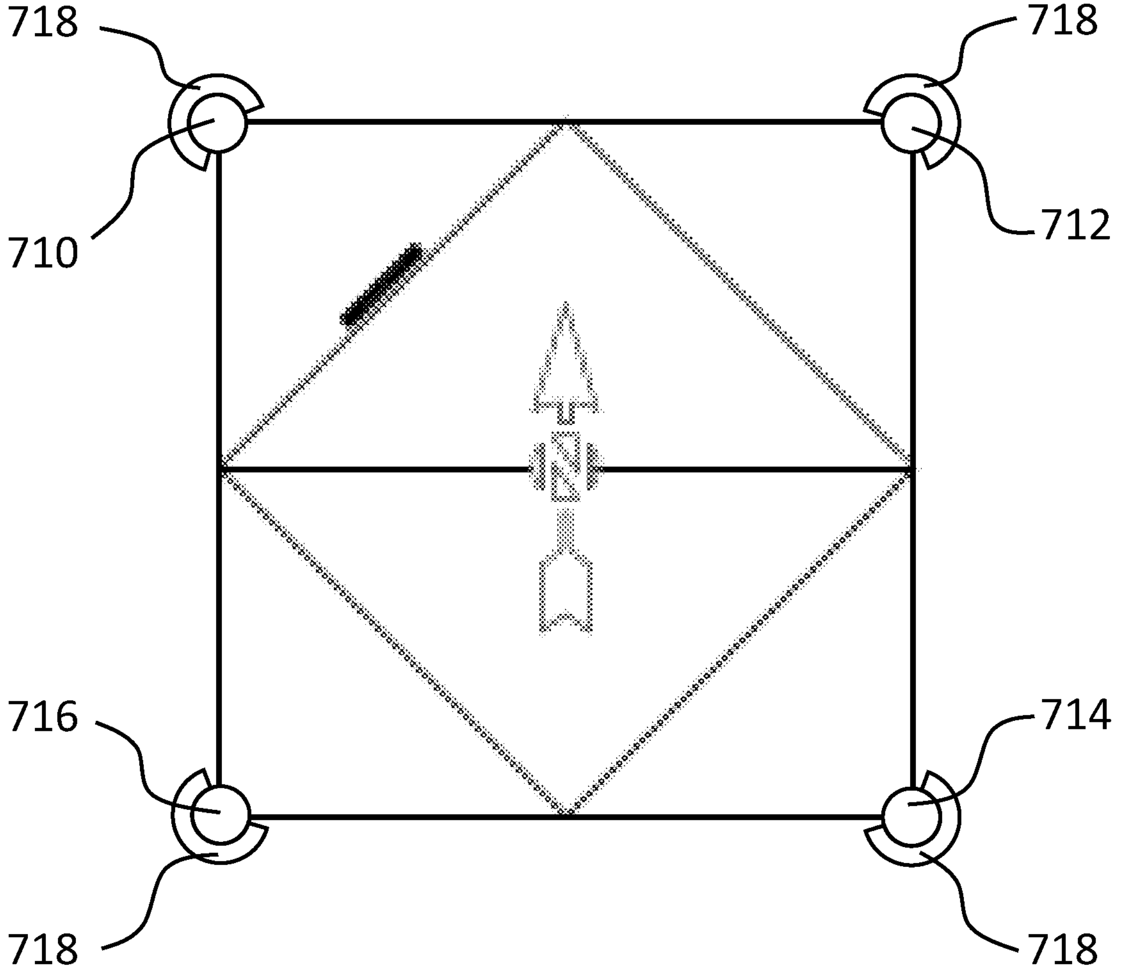
FIG. 12 is a schematic illustration of a top plan view of a communication tower equipped with a de-icing system.
Figure 13:
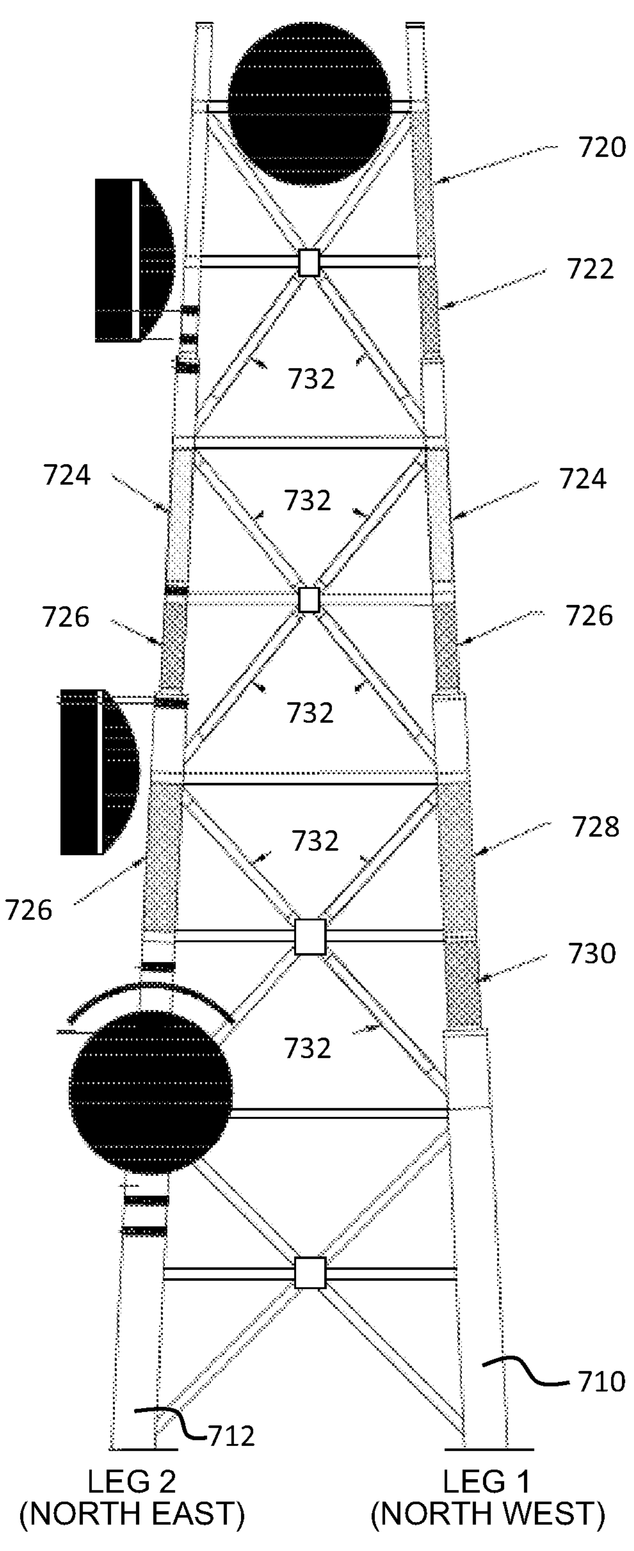
FIG. 13 is a schematic illustration of the communication tower of FIG. 12 as viewed from the north
Figure 14:
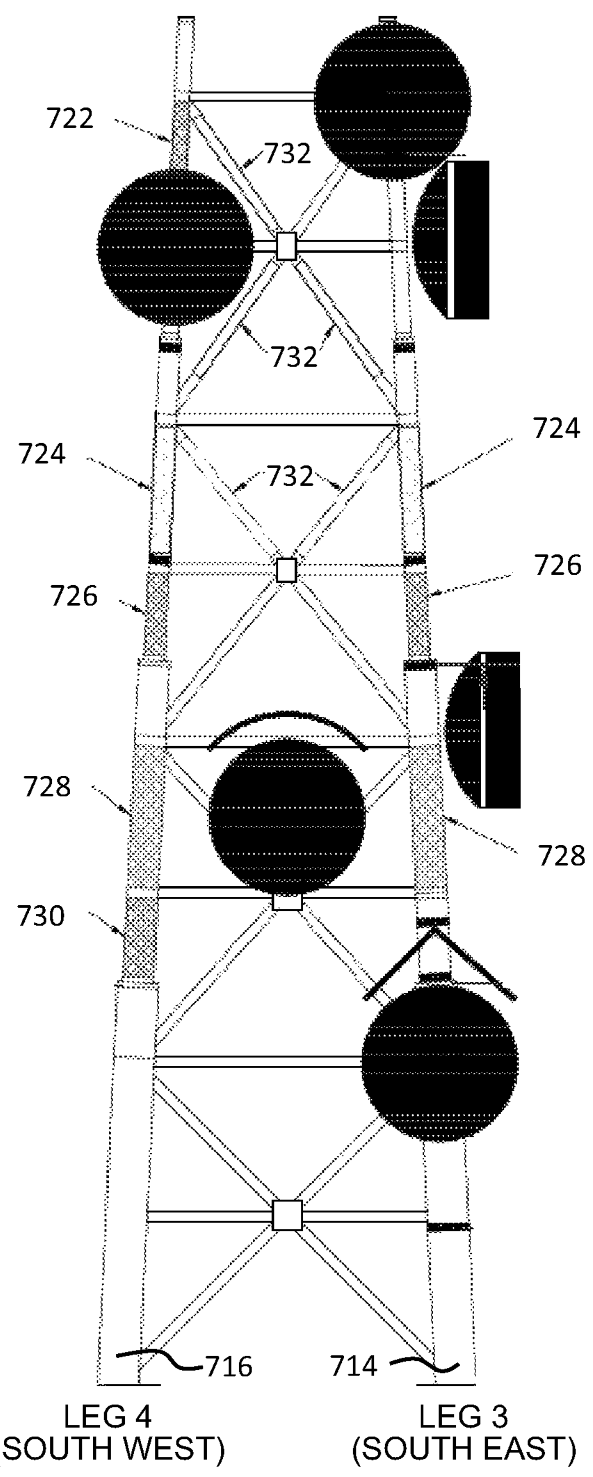
FIG. 14 is a schematic illustration of the communication tower of FIG. 12 as viewed from the south.
Figure 15:
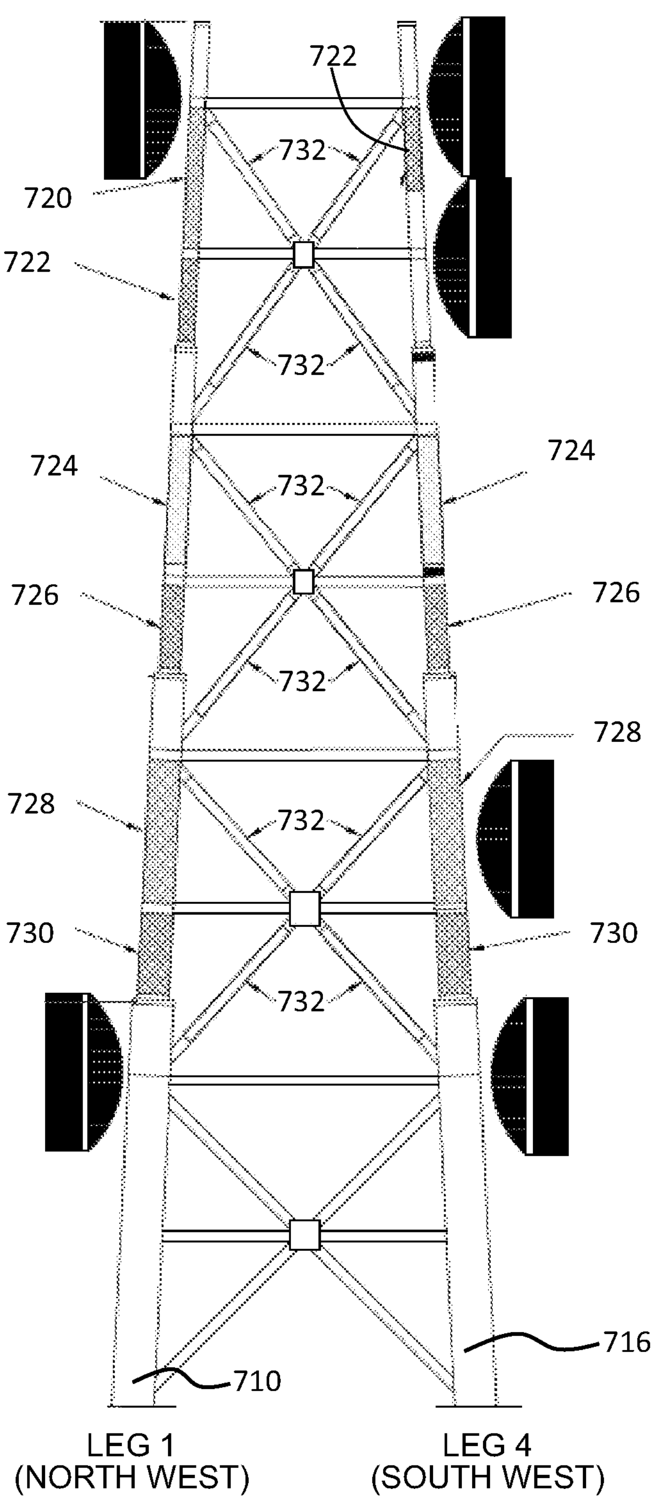
FIG. 15 is a schematic illustration of the communication tower of FIG. 12 as viewed from the west.
Figure 16:
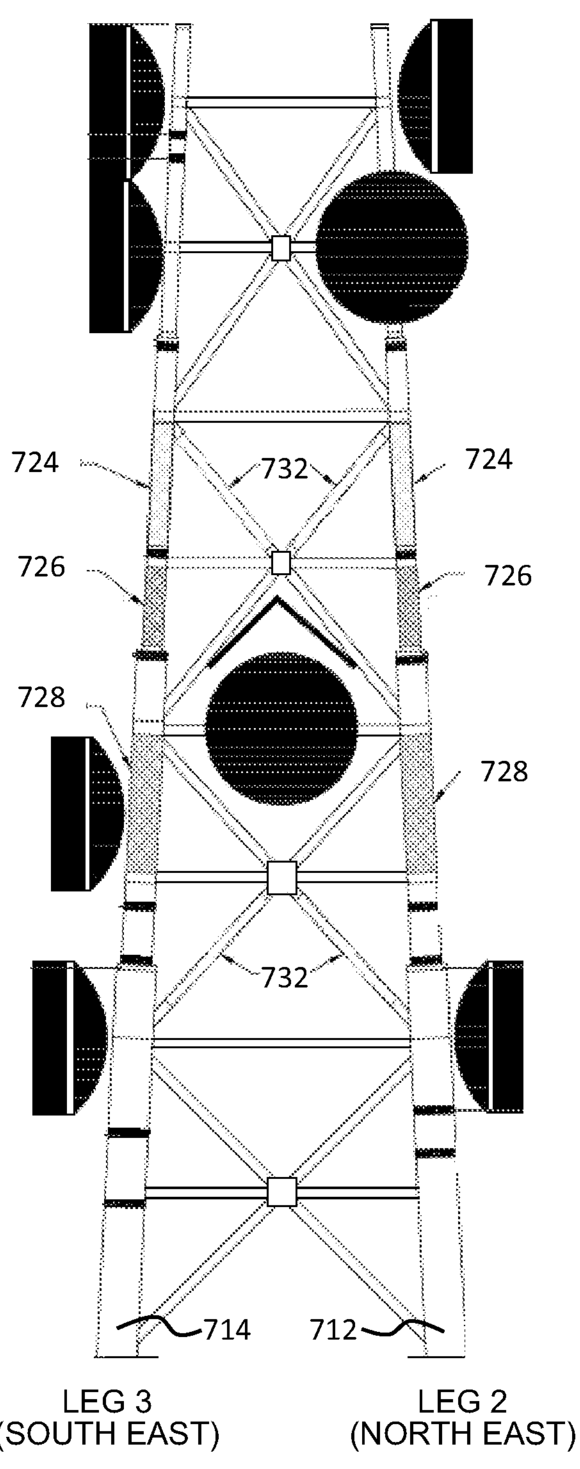
FIG. 16 is a schematic illustration of the communication tower of FIG. 12 as viewed from the east.

FIGS. 12-16 schematically illustrate a de-icing system with multiple leg de-icing assemblies and cross brace de-icing assemblies attached to a communication tower 700. This example illustrates the modular nature of the de-icing system. All the de-icing assemblies in this example are rectangular in shape (when not attached to the communication tower) and are secured along a leg or to a cross brace of the communication tower. FIG. 12 schematically illustrates a top plan view of an exemplary communication tower, identifying each of four legs 710, 712, 714, 716 of the communication tower, with each leg having a de-icing assembly 718 affixed thereto. FIG. 13 illustrates the communication tower as viewed from the north, FIG. 14 illustrates the communication tower as viewed from the south, FIG. 15 illustrates the communication tower as viewed from the west, and FIG. 16 illustrates the communication tower as viewed from the east. The tower 700 includes a first leg 710, a second leg 712, a third leg 714, and a fourth leg 716. One leg de-icing assembly 720 that measures 105.5 inches by 24 inches is attached near the top of the first leg 710 (see FIG. 13). Two leg de-icing assemblies 722 that measures 45.5 inches by 24 inches are attached near the top of the first and fourth legs. Four leg de-icing assemblies 724 that measure 93.5 inches by 30 inches are attached to the upper middle section of each of the first, second, third, and fourth legs. Four leg de-icing assemblies 726 that measure 45.5 inches by 30 inches are attached to the middle section of each of the first, second, third, and fourth legs. Four leg de-icing assemblies 728 that measure 105.5 inches by 41 inches are attached the lower middle section of each of the first, second, third, and fourth legs. Two leg de-icing assemblies 730 that measures 45.5 inches by 41 inches are attached near the top of the first and fourth legs. Thirty cross brace de-icing assemblies 732 that measure 93.5 inches by 9.5 inches are attached to each of the cross braces. As will be appreciated, the selection of size and number of de-icing assemblies in this exemplary embodiment is based on the particular size and arrangement of this communication tower and the number and placement of antennas. Other communication towers of different sizes and different number and placement of antennas would require a different combination of de-icing assemblies having differing dimensions.

The foregoing description of exemplary embodiments has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

The invention claimed is:

1. A de-icing system for mitigating the accumulation of snow and ice on components of a communication tower, comprising:

a de-icing assembly configured to be attached to one or more components of a communication tower, said deicing assembly comprising:

a backing member, and at least one pneumatic tube disposed on a front facing of said backing member and defining an expandable chamber configured to be selectively inflated and selectively deflated;

a fastener configured to affix said backing member of said de-icing assembly to said one or more components of said communication tower; and an air supply source, in fluid communication with said pneumatic tube, that is configured to supply inflating air to said pneumatic tube to inflate said pneumatic tube on demand;

a controller configured to control operation of the de-icing assembly to cycle the inflation and deflation of the at least one pneumatic tube of the de-icing assembly;

at least one sensor disposed at the communication tower and in operative communication with the controller, which sensor is configured to:

monitor one or more of an environmental condition, or condition of the deicing assembly, send a signal to said controller indicative of a current monitored condition, and cause said controller to trigger the initiation of cycling of inflation and deflation of the pneumatic tube of the de-icing assembly upon receipt in the controller of a signal indicating the presence of a predefined condition;

wherein the at least one sensor includes a wind sensor configured to send a signal corresponding to a measurement of a direction and a speed of a prevailing wind at the communications tower, and wherein the controller is configured to determine which of a plurality of de-icing assemblies to cycle based in part on said wind sensor signal.

2. The de-icing system of claim 1, wherein said controller is in operative communication with one or more of said air supply source or a controllable air valve disposed between said air supply source and said de-icing assembly, and is configured to activate and deactivate the air supply source or actuate the air valve between an open and closed state to cause inflating air to selectively inflate or deflate the at least one pneumatic tube of the de-icing assembly.

3. The de-icing system of claim 1, wherein the at least one sensor includes a temperature sensor configured to send ambient air temperature signals to the controller, wherein in response to a signal indicative of the ambient temperature at the tower being at or below 32-degrees Fahrenheit, the controller triggers initiation of cycling of inflation and deflation of the pneumatic tube of the de-icing assembly.

4. The de-icing system of claim 1, wherein the at least one sensor includes a moisture sensor configured to determine the presence at the communication tower of moisture in the form of snow or ice, wherein in response to a signal indicative of the presence of snow and ice at the communication tower, the controller triggers initiation of cycling of inflation and deflation of the pneumatic tube of the de-icing assembly.

5. The de-icing system of claim 1, wherein the at least one sensor includes a pressure sensor configured to measure pressure within the at least one pneumatic tube, wherein the controller is further configured to cease cycling an inflation and deflation of the pneumatic tube in response to a low pressure signal from the pressure sensor indicative that said one or more pneumatic tubes has ruptured.

6. The de-icing system of claim 1, wherein the at least one sensor includes a pressure sensor configured to measure pressure within the at least one pneumatic tube, and wherein the controller is configured to trigger a cycling of the inflation and deflation of the at least one pneumatic tube in response to a signal indicating the presence of an elevated pressure that is higher than an expected threshold value, which is indicative of accumulation of one or more of heavy snow or ice on the pneumatic tube creating increased pressure therein.

7. The de-icing system of claim 1, wherein the at least one sensor includes a pressure sensor affixed to a component of the communications tower adjacent said de-icing assembly and configured to measure an increase of pressure directly on said sensor cause by accumulation of snow or ice, wherein said controller is configured to trigger the cycling of inflation and deflation of the at least one pneumatic tube in response thereto.

8. A method for mitigating the accumulation of snow and ice on a component of a communication tower, comprising:

affixing a plurality of de-icing assemblies to a plurality of components of a communication tower, the de-icing assembly having a backing member, and at least one pneumatic tube disposed on a front facing of said backing member and defining an expandable chamber configured to be selectively inflated and selectively deflated;

detecting the presence of an accumulation of one or more of snow or ice on the component of the communication tower or the at least one de-icing assembly, the detecting step comprising:

monitoring, by at least one sensor, one or more conditions at the position of the de-icing assembly on the communication tower, the at least one sensor including one or more of a temperature sensor, a moisture sensor, a pressure sensor, or a wind sensor, wherein said monitoring step includes measuring, by the wind sensor, a direction and a speed of a prevailing wind at the communication tower;

sending a signal from the at least one sensor to a controller configured to control operation of the de-icing assembly, the signal corresponding to a current state of the condition being monitored;

determining, by the controller, the signal meets a predefined threshold criteria indicative of the presence of one or more of snow or ice on one or more of the component of the communication tower or the de-icing assembly;

determining, by the controller, which of the plurality of de-icing assemblies to cycle based in part on a wind sensor signal received in the controller; and periodically cycling inflation and deflation of the at least one pneumatic tube in response to a detection of the presence of one or more of snow or ice on the component of the communication tower or the de-icing assembly, causing the snow or ice to break free from, and fall off of, the component of the communication tower and pneumatic tube affixed thereto.

9. The method of claim 8, wherein:

said monitoring step comprises measuring, by the temperature sensor, ambient air temperature at the location of the de-icing assembly; and said determining step comprises determining, by the controller, that the signal received from the temperature sensor indicates that the ambient air temperature is at or below 32-degrees Fahrenheit, as the predefined threshold temperature criteria indicative of the presence of snow or ice on.

10. The method of claim 8, wherein:

said monitoring step comprises monitoring, by the moisture sensor, for the presence or absence of moisture in the form of snow or ice at the location of the de-icing assembly; and said determining step comprises determining, by the controller, that the signal received from the moisture sensor indicates that moisture in the form of snow or ice is present at the location of the de-icing assembly.

11. The method of claim 8, wherein:

said monitoring step comprises measuring, by the pressure sensor, a pressure within the at least one pneumatic tube; and said determining step comprises determining, by the controller, that the measured pressure within the pneumatic tube is higher than an expected threshold pressure value, indicating the presence of an accumulation of snow or ice on the pneumatic tube of the de-icing assembly.

12. The method of claim 11, further comprising:

ceasing the cycling of an inflation and deflation of the at least one pneumatic tube in response to a low pressure signal received in the controller from the pressure sensor during an inflation stage, indicative that the at least one pneumatic tube has ruptured.

13. The method of claim 8, wherein:

said monitoring step comprises measuring, by the pressure sensor affixed to a component of the communications tower adjacent the de-icing assembly, an increase in pressure on the pressure sensor from a weight of snow or ice accumulating thereon; and said determining step comprises determining, by the controller, that the measured pressure on the pressure sensor exceeds a threshold amount, indicating the presence of an accumulation of snow or ice on the pressure sensor and one or more of a component of the communications tower or the de-icing assembly.

14. The method of claim 8, wherein said cycling step comprises:

periodically activating, by the controller, an air supply source to supply inflating air to the pneumatic tube of the at least one de-icing assembly causing inflation thereof and expansion movement of a pneumatic tube surface on which the accumulated snow or ice has settled so as to cause the snow or ice to break free from, and fall off of, the pneumatic tube of the deicing assembly and adjacent components of the communication tower; and periodically deactivating the air supply source causing the air present in the pneumatic tube to be evacuated or released therefrom, thereby deflating the pneumatic tube and further causing additional of the snow or ice to break free and fall therefrom.

* * * * *